United States Patent [19]
Hunt

[11] 3,798,989
[45] Mar. 26, 1974

[54] MULTIPLE SPEED DRIVE TRANSMISSION
[75] Inventor: Guilbert M. Hunt, Brecksville, Ohio
[73] Assignee: Tokheim Corporation, Fort Wayne, Ind.
[22] Filed: July 10, 1972
[21] Appl. No.: 270,083

[52] U.S. Cl.............. 74/244, 74/230.18, 280/237
[51] Int. Cl............................................ F16h 55/30
[58] Field of Search............ 74/244, 230.18, 230.23, 74/242.15 B, 217 B; 280/236, 237, 238, 259, 260, 261

[56] References Cited
UNITED STATES PATENTS
| | | | |
|---|---|---|---|
| 593,285 | 11/1897 | Eyck | 74/244 |
| 2,421,368 | 6/1947 | Aubert | 74/244 |
| 2,827,797 | 3/1958 | Bell et al | 74/244 X |

FOREIGN PATENTS OR APPLICATIONS
961,243  1/1948  France................. 74/244

Primary Examiner—Stanley H. Tollberg
Assistant Examiner—Larry Martin
Attorney, Agent, or Firm—Stan C. Kaiman

[57] ABSTRACT

This invention relates to a transmission mechanism, for use for example on a bicycle, capable of varying the effective diameter of either the driver or driven member of the transmission, thereby altering the drive ratio involved. A manually settable ratio selecting mechanism actuates an interposer which forces radially outward a plurality of segments, thereby increasing the effective diameter, or releases the segments for retraction to a lesser effective diameter.

A yieldable slack storing device maintains a fixed tension on a flexible drive means connecting the members of the transmission, thus compensating for the changing diameter of the transmission member.

17 Claims, 6 Drawing Figures

MULTIPLE SPEED DRIVE TRANSMISSION

BACKGROUND AND SUMMARY OF THE INVENTION

The prior art discloses numerous mechanisms for use in varying the drive ratio between two transmission members, such as may be found for example on bicycles. One typical mechanism is the multi-sprocket mechanism, located on the driver or driven member, with means for transferring the flexible drive means from one sprocket to another. Typical of the prior efforts is U.S. Pat. No. 3,181,383 issued May 4, 1965, to L. C. H. Juy. Another typical device is the driven hub gearing system shown in U.S. Pat. No. 3,372,608 issued Mar. 12, 1968, to H. K. Gleasman. Such structures, however, are complex, less reliable in operation and materially more expensive than a single speed drive. In fact, it is often stated that the disadvantages are usually magnified as the number of ratios provided is increased. In spite of the problems relating to variable ratio transmissions, the market has grown, particularly in the multiple speed bicycle market.

In order to meet the demand for multiple speed capabilities, an improved mechanism is needed that is capable of operating on the driver and/or driven sprockets, or in the alternative, replacing both in order to achieve the desired ratio.

It is, therefore, a primary object of this invention to provide a transmission system which is capable of providing a number of drive ratios by varying the effective diameter of a transmission member.

It is a further object of the invention to provide a transmission mechanism in which flexible drive member is maintained in contact with a single sprocket.

A still further object of this invention is to provide a mechanism that is readily adaptable to present bicycle structures, while requiring a minimum of modification or conversion parts.

Another object of the invention is to provide a mechanism capable of utilizing a standard bicycle chain, rear sprocket and yieldable chain slack mechanism.

A further object is to provide a mechanical ratio selecting mechanism which is in an area convient to the operator for actuating the transmission mechanism.

It is another object of the invention to provide a system that is extremely durable. It is a further object to provide an adjustment-free transmission.

Yet another object is to provide an efficient and reliable system in operation while being simple and economical.

The above and other features and objects of the invention will be better understood from the following detailed description of a typical embodiment illustrated in the accompanying drawings in which.

Figure 1:
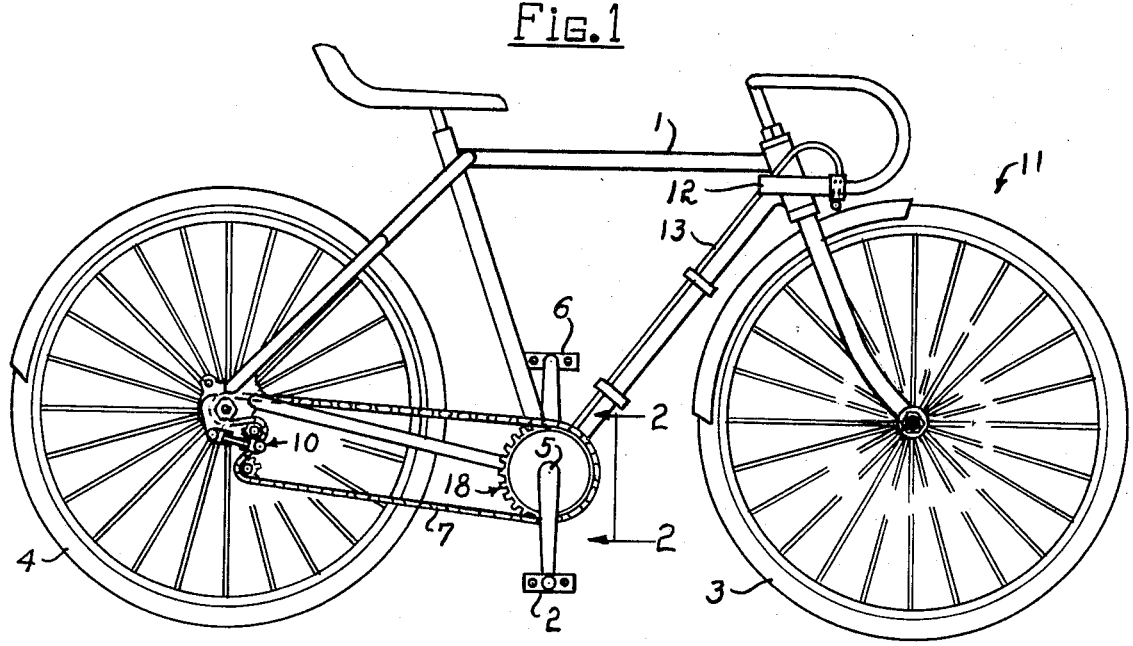
FIG. 1 is a side view of a bicycle equipped with a multiple speed drive transmission in accordance with this invention.

To now describe invention in detail, referring first to FIG. 1, I have shown a multiple speed bicycle 11 equipped with a three speed drive sprocket 18 in the low speed, retracted position. The bicycle consists basically of a standard, unalternated frame 1 to which front and rear wheels 3 and 4 are mounted to turn on parallel transverse axis. The drive pedals 2 and 6 are mounted to the frame 1 for rotation of pedal crank drive shaft 5 about the pedal crank axis and perpendicular to the direction of movement of the bicycle. The pedal crank drive shaft 5 carries the drive sprocket assembly 18 in a circular direction as a conventional sprocket. The bicycle chain 7, a standard assembly, interconnects and thereby transmits motion from the drive sprocket assembly 18 to a conventional rear drive sprocket, not shown. In order to compensate for changing sprocket diameters, a standard chain tensioning and storing mechanism, indicated generally by numeral 10 and similar in construction to that shown in U.S. Pat. Ser. No. 3,181,383 to L. C. H. Juy, but without the transverse movement capabilities is used.

Shift mechanism 12, incorporated as a part of the operator's grip is provided to displace Bowden control cable 14, not shown in FIG. 1, as it is guided and protected by sheath 13. This shift mechanism, while shown here as a conventional grip type, could be any system involving a lever or the like which would act to tension the control cable 14, while being located within the operator's reach.

Figure 2:
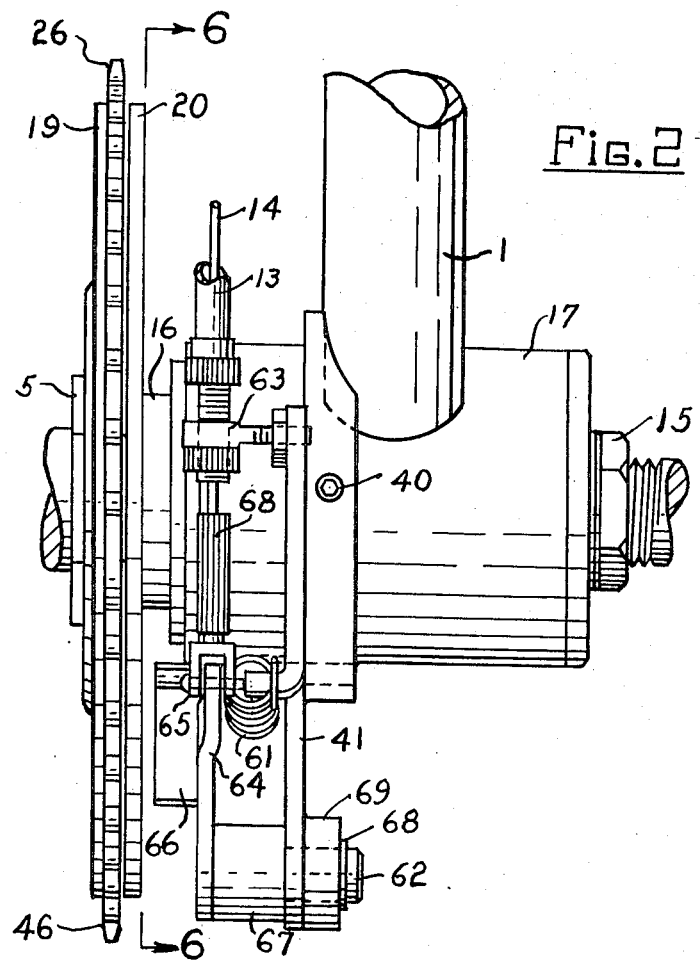
FIG. 2 is an elevation view of the lower bicycle frame showing the carrier, drive sprocket, interposer and crank.

The sprocket assembly 18 has three effective diameters (low, second and high speed) and is used in place of a standard front drive sprocket. FIG. 2 shows the sprocket assembly 18 in a plane disposed transversely with the axis of the pedal crank. The sprocket assembly 18 is held in place relative to the pedal crank drive shaft 5 identically to the conventional method presently being used, for example a locknut 15. The only modification required to adapt a standard bicycle to the mechanism is the sizing of a spacer 16. By varying the thickness of spacer 16, the sprocket assembly 18 can be correctly positioned to prevent interference between moving and stationary parts. As the carrier housing 17, brazed to frame 1, is a conventional carrier and required no modifications to incorporate this invention, it will receive no further explanation.

Figure 3:
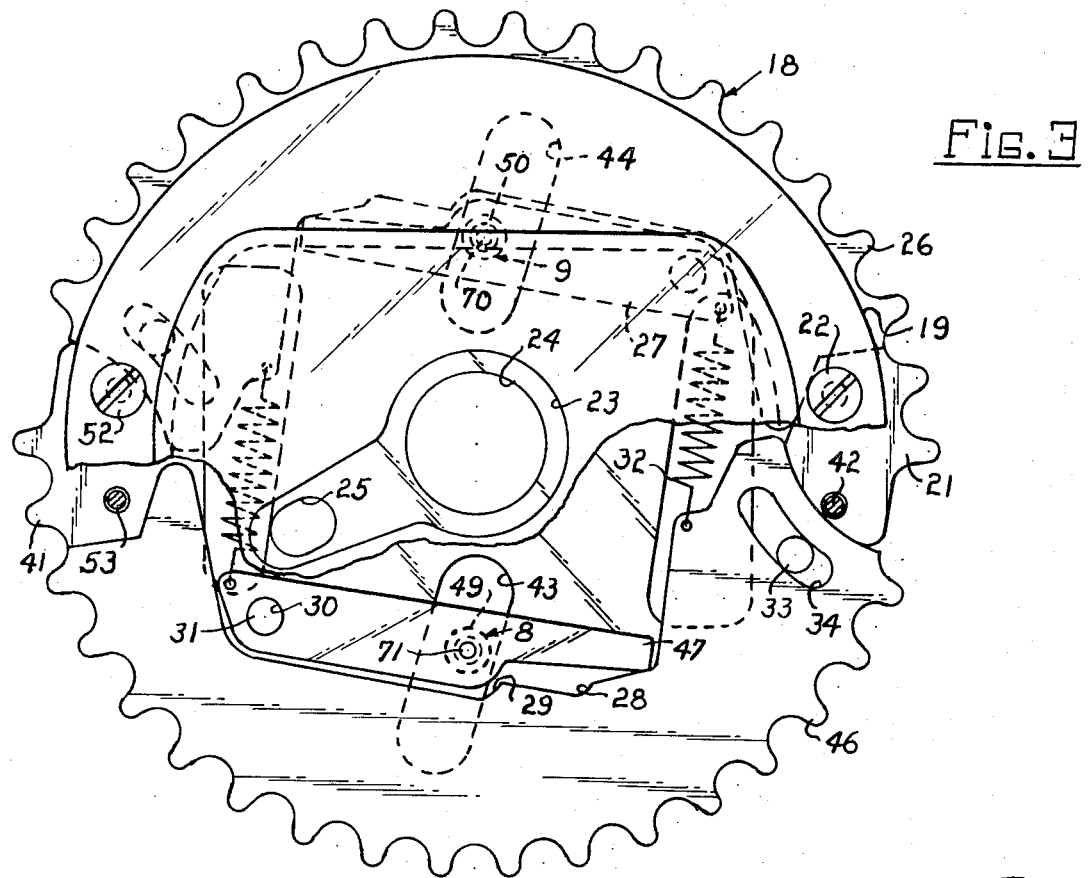
FIG. 3 is a side view of the drive sprocket assembly in the low gear position.

FIG. 3 of the sprocket assembly 18, in low gear position, shows a partially cutaway cover 19 in order to depict the internal mechanism. Cover 19 and innerframe 20, the assembly enclosure, are flat plates paralled to each other and held apart by the thickness of two cam segments 21 and 41, placed diametrically opposite from each other on the circumference of the plates. Innerframe 20 is brazed to one of the flat sizes of cam segments 21 and 41 while the cover 19 is held in place by screws 22, 42, extending through cam segments 21 and innerframe 20, and by screws 52 and 53 extending through the cam segment 41 and innerframe 20, thereby allowing cover 19 to be removed for maintenance and assembly. Additionally, each cam segment 21 and 41 outer edge contain two sprocket teeth to serve as reference mark for engaging chain 7 during the shifting cycle. The cover 19 and innerframe 20 have center holes 23 and 24 respectively, of sufficient diameter to locate over the pedal crank shaft 5. Additionally, locating hole 25 in the innerframe 20, serves to accept a transverse member of a standard pedal crank 5 in such a manner that the sprocket assembly 18 is carried relative to it, without any slippage.

Figure 4:
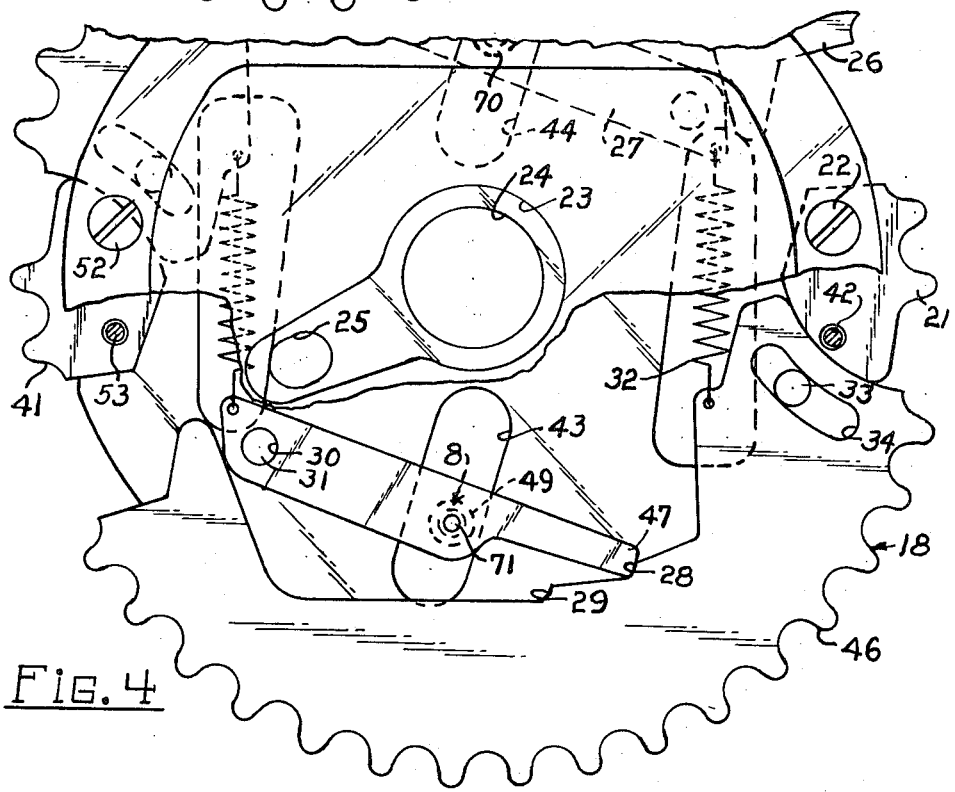
FIG. 4 is a partial side view of the drive sprocket assembly in the 2nd gear position.
Figure 5:
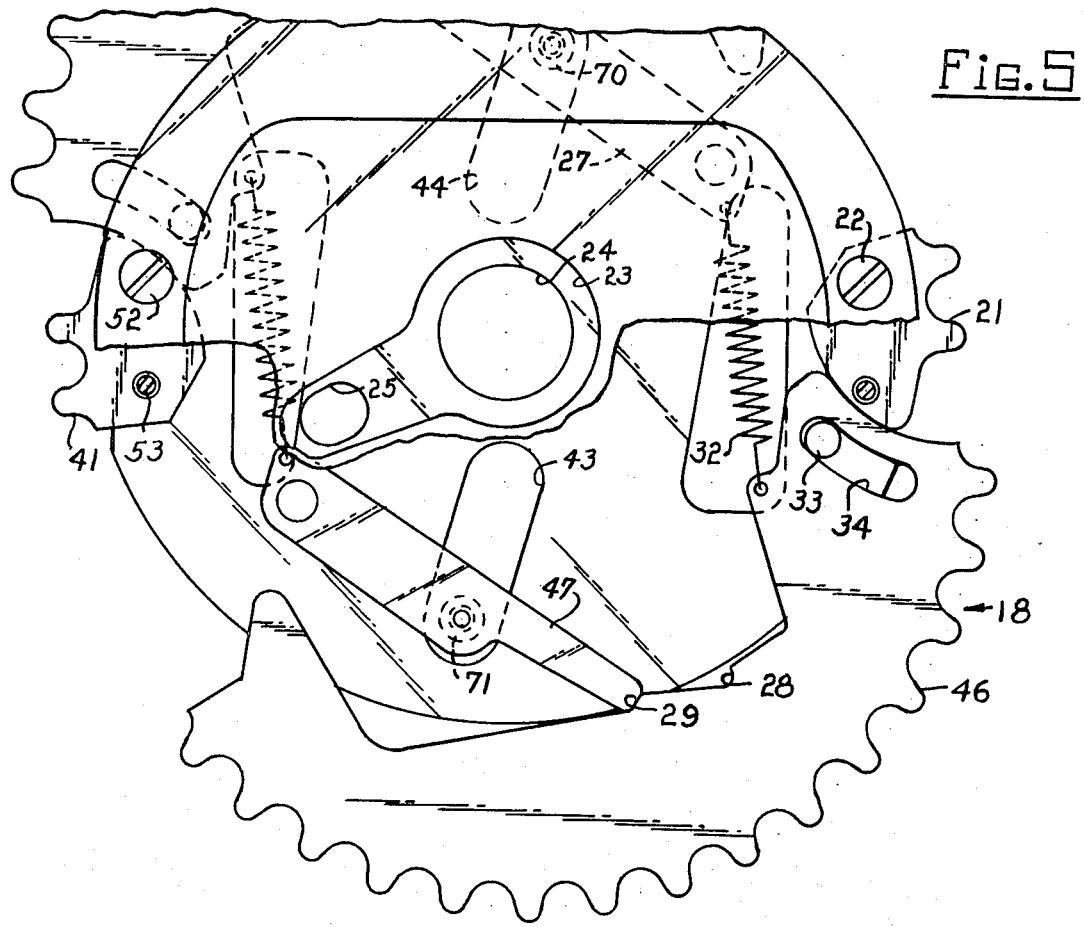
FIG. 5 is a partial side view of the drive sprocket assembly in the high gear position.

Between the cover 19 and innerframe 20 are positioned two radially movable sprocket segments 26 and 46. The sprocket assembly 18, has three effective diameters which are determined by the radial position of two movable sprocket segments 26 and 46 which are diametrically opposed to each other. FIG. 3, 4 and 5 show the relative position of the cam segments for each speed.

The radial position of each sprocket segments 26 and 46 is maintained by an actuator 27 and 47. Like the sprocket segments, the actuators 27 and 47 are contained within the innerframe 20 and cover 19 enclosure and due to its thickness being less than the gap, it is free to slide between the plates in a plane parallel to the sprocket segments 26 and 46.

Because each sprocket segment 26 and 46 are identical in construction and operation, the discussion is limited hereafter to sprocket segment 26. As shown in FIG. 3, actuator 27 forces the sprocket segments 26 radially outward and locks it in place by engaging in detent 28 for the second gear position as detent 29 for the high gear position. The second and high gear position is shown in FIG. 4 and 5. Actuator 27 motion is restrained due to its being pivoted about hole 30 through which shaft 31 passes transversely between innerframe 20 and cover 19. The actuator 27 is thus free to pivot about shaft 31 in such a manner to enable it to force the sprocket segment 26 radially outward. In order to allow actuator 27 to return to a retracted position, spring 32 is attached to it while the other end is attached to the opposing sprocket segment 46. Thus, upon release of actuator 27 from detent 28 or 29, the sprocket segments 26 will be biased inwardly to the desired position by spring 32 operating thereon.

The sprocket segment 26 and 46, diametrically opposed to each other with an outer periphery containing conventional sprocket teeth for engaging chain 7, is maintained by stud 33 transversely between the innerframe 20 and cover 19. As each sprocket segment contains slot 34, through which stud 33 extends, radial movement is limited so that both ends of the sprocket segment 26 move in radial direction equally in such a manner as to keep a nearly round sprocket. This is further maintained by a rounded bearing surface between the sprocket segment 26 and the cam segments 21 as shown in FIG. 3, 4 and 5. This configuration limits movement to that described above in response to actuator 27. To retract the sprocket segments to a lower gear, the actuator 27 is moved toward the axis of pedal crank 5 and once it has cleared detent 28 or 29, spring 32 will retract both the actuator 27 and the sprocket segment 26 to a lesser effective diameter.

Actuator 27 and 47 operate pivotly as described above. However, movement is controlled by finger 70 and 71 shown generally in phantom on FIG. 3, 4 and 5 and whose position is determined by the stationary interposer, described below. Finger 70 and 71 are brazed to the flat surfaces of actuator 27 and 47 respectfully so as to extend perpendicular thereto. Roller 8 and 9, free to rotate on the undercut fingers 70 and 71, are held in place by spring clips, 49 and 50. As fingers 70 and 71 extend perpendicular to the sprocket assembly 18, slots 43 and 44 are provided in innerframe 20 in a manner to allow radial movement of roller 8 and 9 in response to interposer assembly 35.

Figure 6:
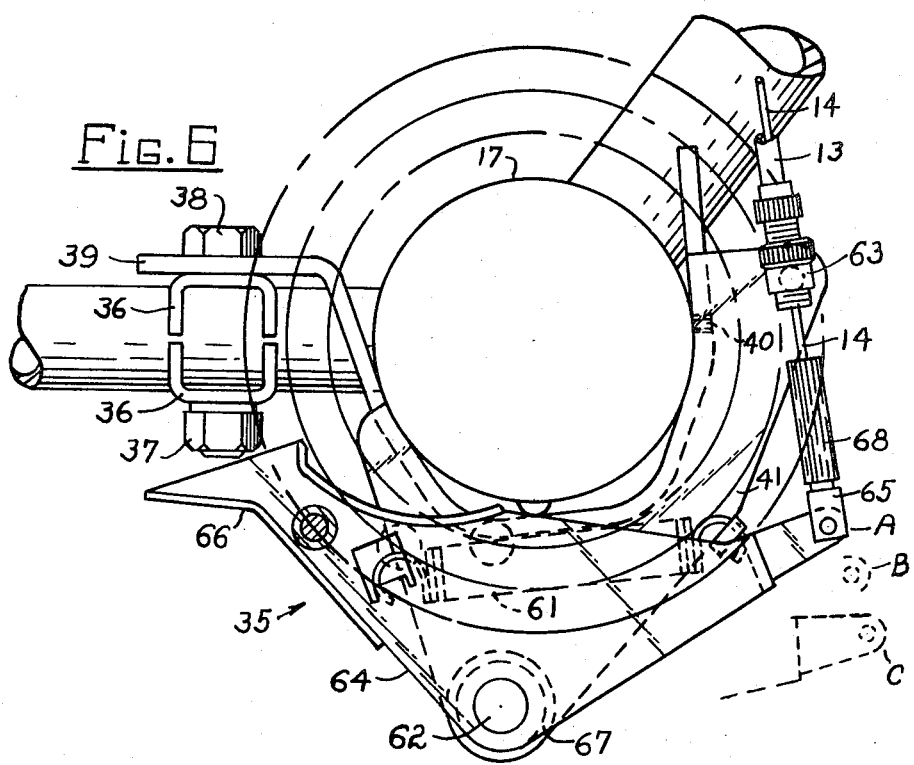
FIG. 6 is a view of the interposer assembly.

Referring now to FIG. 6 and 2, the interposer assembly 35 is firmly attached between the lower horizontal tubular frames of a standard bicycle by means of two interposer arm retainers 36 and retainer fasteners 37 and 38. Because the interposer arm 39 is also attached by fastener 37 and 38 in a manner as to be sprung between it and the pedal crank carrier 17, it is in firm contact with the carrier and thereby properly located. Set screw 40 shown in phantom, will further serve to lock the interposer arm 39 in place as it is diametrically opposed on the pedal crank carrier 17 from the interposer arm retainer 36.

The flat surface of the interposer arm 41, which lies in plane parallel to the sprocket assembly 18 face, acts as a positioner for the stationary end of interposer spring 61 shown in phantom, pivot stud 62, and Bowden control cable retainer 63, all of which control the pivot motion of interposer 64. Pivot stud 62, about which the interposer moves, is firmly attached perpendicularly to the flat interposer surfaces and parallel to the pedal crank axis. The active end of the interposer 64 contains the guide channel portion 66 of the interposer while the other end is connected to the Bowden control cable 14, via a conventional clamp arrangement 65. The interposer 64 motion is thus about the pivot stud 62, and in a plane parallel to the sprocket assembly 18 and at right angles to the actuator fingers 70. Note the three positions of the interposer as shown dotted on control end of interposer 64.

On the active end of the interposer 64 is the guide channel 66 to position the actuator finger 70 and 71, described in FIG. 3 above. As the guide channel 66 part of the interposer 64 is moved radially outward from the pedal crank axis, the actuator fingers 70 and 71 will be carried outward in a manner to effectively vary the sprocket assembly 18 diameter. Conversely, as the guide channel is moved radially inward, it will release the sprocket segments 26 and 46 so that they will be retracted to a lesser diameter. Note A, B and C show the relative position for each speed.

The guide channel 66 portion of the interposer is maintained in a plane parallel to the interposer arm face 41 by cylindrical spacer 67 around pivot stud 62 which is in turn locked to the interposer arm boss 69 by snap ring 68.

The channel guide 66, active end portion of the interposer 64, can thus pivot around stud 62 while the other end of the pivoting interposer is connected to the free end of the Bowden control cable 14, by locknut 68 and clamp 65. As the operator manually controls the position of the cable by a shift mechanism, described in FIG. 1, the interposer is thus pivoted in response to Bowden cable 14 tension and in turn directly causes the sprocket segment 26 and 46 to be moved outward. In order to retract the sprocket assembly 18 to a lesser diameter, the interposer spring 61 will pivot the interposer arm in a direction opposite to the control cable, thereby reducing the guide channel effective diameter, and thereby causing the actuator fingers 70 to move inward releasing the sprocket segments 26 and 46. This has the effect to vary the drive ratio between the sprockets of the bicycle.

It will be evident to those skilled in the art that the transmission mechanism above disclosed might be equally well employed at the rear axle rather than at the pedal axle 5; thus, this invention is applicable to either the driver member or driven member of a transmission, or to both. Similarly, it will be evident that any desired number of speeds, rather than the three herein described, may be achieved by simply providing additional positions for the sprocket segments 26 and 46 along with the corresponding actuator detent positions to lock them in place. Thus, in application on a bicycle, a mechanism in accordance with this invention may be employed alone, with a similar mechanism, or with a multiple speed drive transmission of different construction to achieve a large number of speed capabilities for example, when used alone three speeds are possible; when used together, driver and driven sprockets, nine speeds are possible; and when used in conjunction, with a variable drive ratio mechanism, similar to that described in U.S. Pat. Ser. No. 269,649, issued to Guilbert M. Hunt, 15 speeds are possible.

Moreover, it will be appreciated that the bicycle installation show is merely an exemplary embodiment, and that this invention is applicable to any transmission having a driver member, a driven member, and a flexible drive member interconnecting the driver member and driven member.

While a specific embodiment of the invention has been shown and described herein for purposes of illustration, it is not desired that the protection afforded by any patent which may issue upon this application be limited strictly to the disclosed embodiment, but that it extend to all structures and arrangements which contain the essences of the invention and which fall fairly within the scope of the claims which are appended hereto.

I claim:

1. A transmission mechanism, comprising
   a. a variable diameter transmission member having a plurality of movable drive segments, and
   b. actuating means controlling said drive segments to vary the effective diameter of said transmission member by radially sliding said drive segments so as to be projected beyond the outer peripheral edge of said variable diameter transmission member.

2. The structure as described in claim 1 wherein said actuating means comprises an interposer means capable of forcing radially outward said drive segments and allowing inward retraction of said drive segments, thereby operating to establish a plurality of predetermined effective diameters of said transmission member.

3. The structure as described in claim 2 wherein said actuating means further comprises remote control means actuating said interposer means.

4. The structure as described in claim 3 wherein said remote control means comprises a manual selector means and a Bowden cable to position said interposer means in its predetermined positions.

5. The structure as described in claim 3 wherein said interposer is spring biased to reposition in counter to remote control means.

6. The structure as described in claim 1 wherein said mechanism further includes a flexible drive means operatively connected to said transmission member, and wherein said transmission member constitutes a toothed sprocket for engagement therewith.

7. The structure as described in claim 6 wherein said mechanism further includes a yieldable chain accumulating means so as to accumulate or release slack in said flexible drive means in accordance with a decrease or increase, respectively in the effective diameter of said transmission member.

8. The structure as described in claim 1 wherein there is at least one pair of drive segments diametrically opposed on said transmission member.

9. The structure as described in claim 8 wherein said drive segments comprise a plurality of teeth on the outer periphery thereof for engagement with said flexible drive means.

10. The structure as described in claim 8 wherein said drive segments are physically positioned outwardly by said interposer operating through actuator arms pivoted by projecting actuator fingers, and held outwardly in detents in said drive segments.

11. The structure as described in claim 10 wherein said drive segments are spring biased inwardly for retraction to a lesser effective diameter, when said actuator arm release from said detents.

12. The structure as described in claim 1 wherein said transmission member further comprises a housing member non-rotatably fixed relative to a rotating shaft.

13. The structure as described in claim 12 wherein said drive segments and actuator arms are mounted within said housing for radial movement in response to said actuating means.

14. A bicycle comprising a frame, front and rear wheels mounted rotatably to said frame, a transmission system comprising a forward sprocket assembly mounted to the frame for rotation about a pedal crank axis and a rear sprocket assembly for driving said rear wheel, one of said forward sprocket assembly and said rear sprocket assembly having at least two sprocket segments capable of expanding radially, said sprocket segments having teeth on the periphery, thereof, a chain interconnecting said forward sprocket assembly and said rear sprocket assembly, an actuator mechanism consisting of a remote ratio selecting means, an interposer to force said sprocket segments radially outward and release said sprocket segments for retraction, means operatively connecting said remote control means to said interposer, and a spring biased chain slack take-up mechanism.

15. The structure as described in claim 14 wherein said remote ratio selecting means is mounted on said frame and comprising a selector member mounted for movement from one to another of a plurality of predetermined positions corresponding to an equal number of predetermined sprocket position.

16. The structure as described in claim 14 wherein said expandable sprocket assembly is mounted for rotation about an axis on said front drive sprocket of said bicycle.

17. The structure as described in claim 14 wherein said expandable sprocket assembly is mounted for rotation about an axis on said rear driven sprocket of said bicycle.

* * * * *